US012771636B1

(12) United States Patent
Bernardi et al.

(10) Patent No.: US 12,771,636 B1
(45) Date of Patent: Oct. 20, 2026

(54) TRAFFIC ROUTING IN SINGLE CONNECTION LAYER NETWORK

(71) Applicant: Amazon Technologies, Inc., Seattle, WA (US)

(72) Inventors: Giacomo Bernardi, Bologna (IT); Seshadhri Comandur, San Jose, CA (US); Ratul Mahajan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 18/595,087

(22) Filed: Mar. 4, 2024

(51) Int. Cl.
*H04L 45/00* (2022.01)
*H04L 45/12* (2022.01)

(52) U.S. Cl.
CPC ............ *H04L 45/54* (2013.01); *H04L 45/124* (2013.01); *H04Q 2213/13353* (2013.01)

(58) Field of Classification Search
None
See application file for complete search history.

(56) References Cited

U.S. PATENT DOCUMENTS 6,751,219 B1 * 6/2004 Lipp ..................... H04L 49/201 370/406
6,829,634 B1 * 12/2004 Holt .................... H04L 12/1827 709/204
7,730,220 B2 * 6/2010 Hasha ................. H04L 12/1854 370/254
2006/0282505 A1 * 12/2006 Hasha ..................... H04L 12/42 709/207
2011/0128962 A1 * 6/2011 Hunkeler ................ H04L 45/36 370/393
2013/0318222 A1 * 11/2013 Luong ..................... H04L 67/63 709/223

FOREIGN PATENT DOCUMENTS

| | | | | |
|---|---|---|---|---|
| EP | 1398924 B1 * | 6/2008 | ............. | H04L 45/00 |
| WO | WO-0173920 A2 * | 10/2001 | ................ | H02J 9/06 |
| WO | WO-2004086692 A1 * | 10/2004 | ............. | H04L 45/02 |

OTHER PUBLICATIONS

Namyar, P., et al., "A Throughput-Centric View of the Performance of Datacenter Topologies," SIGCOMM '21: Proceedings of the 2021 ACM SIGCOMM 2021 Conference, Aug. 2021, pp. 349-369.
Singla, A., et al., "Jellyfish: Networking Data Centers Randomly," NSDI'12: Proc. of the 9th USENIX Conference on Networked Systems Design and Implementation, Apr. 2012, pp. 1-14, URL: https://www.usenix.org/system/files/conference/nsdi12/nsdi12-final82.pdf.

(Continued)

*Primary Examiner* — Lance Leonard Barry
(74) *Attorney, Agent, or Firm* — Weaver Austin Villeneuve & Sampson LLP

(57) ABSTRACT

Network traffic between a source node and a destination node in a network fabric can be routed by using a routing table represented as a set of logical rings radiating from the destination node. The set of logical rings may include a neighboring ring containing neighbors of the destination node, a waypoint ring containing neighbors of network nodes in the neighboring ring, and one or more outer rings each containing neighbors of network nodes of an adjacent inner ring.

20 Claims, 5 Drawing Sheets

200

= neighboring ring *N(t)*
= waypoint ring *WP(t)*
= outer ring *R1(t)*
= outer ring *R2(t)*

(56) References Cited

OTHER PUBLICATIONS

U.S. Appl. No. 18/749,202, inventors Bernardi G., et al., filed Jun. 20, 2024.

Valadarsky, A., et al., "Xpander: Towards Optimal-Performance Datacenters," CoNEXT '16: Proc. of the 12th International Conference on Emerging Networking Experiments and Technologies, Dec. 2016, pp. 205-219.

* cited by examiner

TRAFFIC ROUTING IN SINGLE CONNECTION LAYER NETWORK

BACKGROUND

Server computers such as those supporting cloud computing services are maintained in facilities commonly referred to as data centers. A small data center may occupy a room or a floor of a building, while a large data center may occupy several floors or an entire building. A typical data center may house thousands of servers that communicate with each other via a network fabric. Depending on the network topology, certain routing schemes can be more effective than others in terms of latency and throughput.

BRIEF DESCRIPTION OF THE DRAWINGS

Various embodiments in accordance with the present disclosure will be described with reference to the drawings, in which.

DETAILED DESCRIPTION

Figure 1:
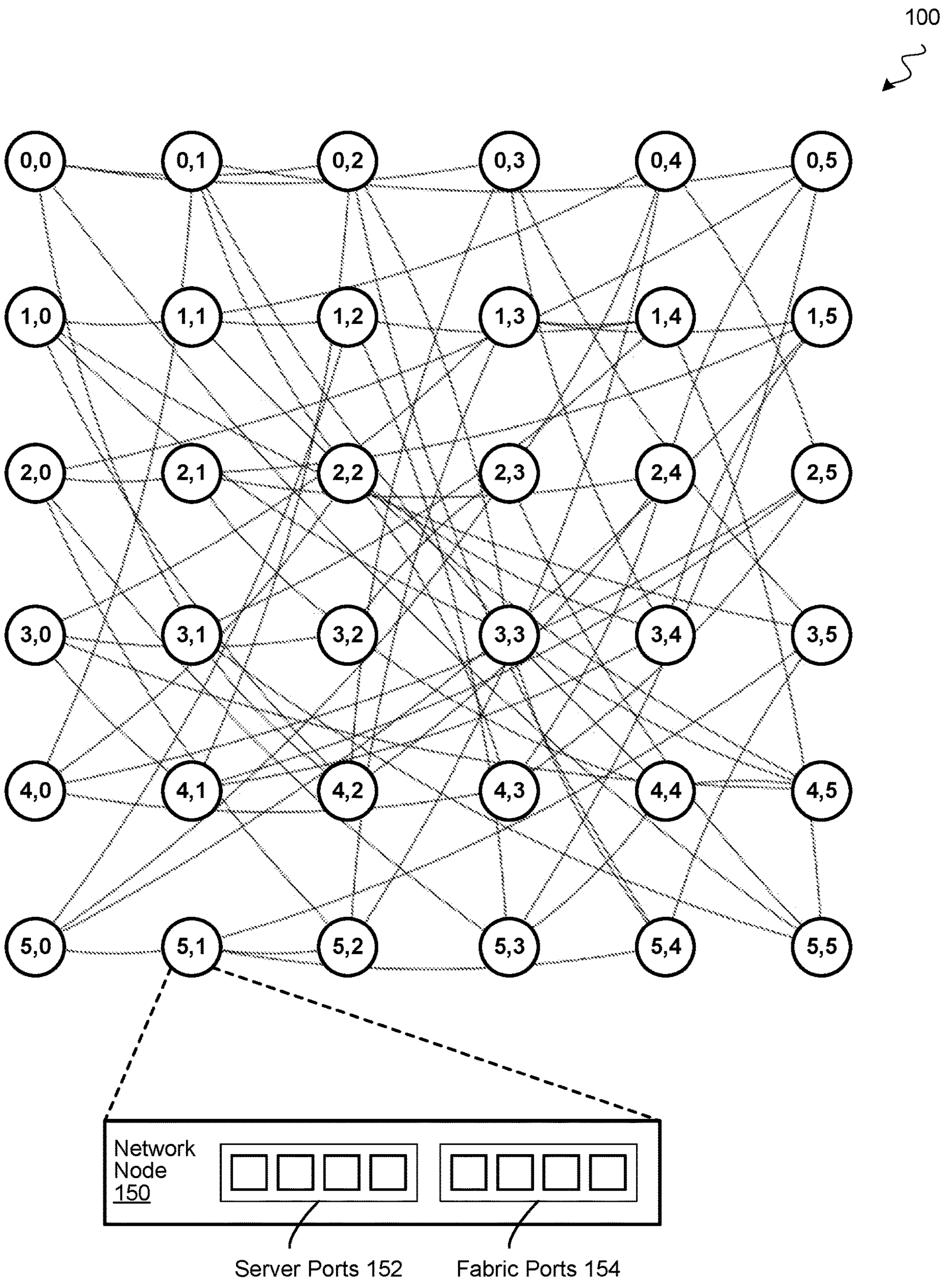
FIG. 1 illustrates an example of a network fabric, according to certain aspects of the disclosure.

To allow a computer network to scale linearly with the number of server racks, a network architecture that uses a single connection layer to interconnect network nodes can be implemented. By employing a single connection layer, top-of-rack (ToR) switches/routers (also referred to as network nodes) can directly connect with each other without using intermediate layers such as aggregation bricks or spines. Each network node can have a number of fabric ports to connect to other network nodes. A network fabric in the form of a random graph can be created by connecting each network node to a set of other network nodes that are randomly or pseudo-randomly selected from the pool of network nodes.

Shortest-path routing in which a source node spreads traffic using equal cost multipath (ECMP) or weighted cost multipath (WCMP) over all shortest paths to the destination node may work well for network topologies that have intermediate layers because there are many such shortest paths. However, for random graph topologies, the set of shortest paths between a source-destination pair can be quite small. In some instances, there can be only one shortest path between directly connected network nodes, which can lead to poor throughput between the source-destination pair.

Another routing technique is to spread the traffic over k shortest paths instead of the shortest paths alone. However, for random graph topologies, the value of k has to be high enough such that a large number of edge-disjoint paths become available between source-destination pairs. Moreover, the paths at intermediate nodes depend on the source and destination, but some network devices may not support next-hop lookups based on the source address. This means that to implement k shortest path routing, k number of tunnels may need to be created from the source to destination. For a network fabric with N network nodes, the number of tunnels required at each network node becomes $k \times (N-1)$. As such, k shortest paths may not be suitable for large fabrics.

The techniques disclosed herein provide a network routing scheme that is suitable for use in a network fabric having a single connection layer to interconnect the network nodes. The network fabric can be a collection of interconnected computers and/or servers located, for example, in a data center. The interconnected computers and/or servers can be connected using network devices (also referred to as network nodes) such as switches/routers. Each network node can be connected to a degree d number of other network nodes in the network fabric. The degree d can be the same for all the network nodes in the network fabric, or can vary depending on the network topology and/or capabilities of each network node. In some implementations, the network node connections can be randomly or pseudo-randomly selected to create a random graph topology. The routing scheme can create many edge-disjoint paths between a source and destination in a random graph by routing the network traffic through many neighbors of the source node and many neighbors of the destination node, such that source-neighbors use different destination-neighbors. This can help prevent the total capacity between the source and destination nodes from being bottlenecked close to either the source or destination.

The routing scheme with respect to a destination node can be implemented by partitioning the network nodes of the network fabric into groups to form a routing table represented as concentric circles around the destination node or logical rings radiating from the destination node. The logical rings may include a neighboring ring containing neighbors of the destination node, a waypoint ring containing neighbors of network nodes in the neighboring ring, and a set of one or more outer rings each containing neighbors of the adjacent inner ring. When a network node receives network traffic for a destination node, the logical ring that the network node belongs to (in relation to the destination node) is determined, and the network traffic is routed towards the destination node by forwarding the network traffic to network nodes in the adjacent ring towards the destination node. Network parameters can be used to control the number of network nodes in the waypoint ring, and the number of network nodes in the adjacent ring that the network traffic is forwarded to.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a network fabric 100 having a random graph topology formed by connecting network nodes without intermediate network layers. Network fabric 100 may include network nodes (e.g., ToRs) physically arranged in rows and columns as shown, and each network node can be identified by indices representing the row and column of the location of the network node. In the specific example shown, network fabric 100 includes 36 network nodes arranged in six rows and columns. It should be understood that the network fabric may include thousands or more network nodes.

The upper left network node at row 0 and column 0 can be associated with the identifier (0,0) and be referred to as network node r(0,0). The remaining network nodes in the first row can be referred to as network node r(0,1), network node r(0,2), network node r(0,3), network node r(0,4), and network node r(0,5), and so on. In other implementations, network fabric 100 can be arranged in a different physical configuration (e.g., non-rectangular), and the network nodes need not be arranged in a grid-like pattern. The network nodes can also be identified using other types of identifiers.

Each of the network nodes can be implemented using a network device 150 such as a switch or a router. Each network node may include processing logic to carry out functions of the network node. The processing logic can be implemented, for example, using one or more of application specific integrated circuit (ASIC), field programmable gate array (FPGA), network processing unit (NPU), processor, or system-on-chip (SoC). At each network device 150, some number of ports can connect to the servers of the rack, and the remaining ports can connect to other network nodes in the network fabric. In the example shown, each network device 150 may have eight connection ports including four server ports 152 to connect to servers in the rack, and four fabric ports 154 to connect to other network nodes in the fabric. Although this shows a 50/50 split in the bandwidth capacity of the network node between fabric/server capacity, other split ratios are possible. For example, allocating more ports to the network fabric can yield a less oversubscribed fabric.

It should also be noted that each network device can implement a different number of connection ports, and that each fabric port can implement a breakout into multiple links to connect to other network nodes. By way of example, a network device can have 32×400 G connection ports, with 16×400 G server ports and 16×400 G fabric ports. Each of the 16×400 G fabric ports can implement a breakout into 4×100 G links to allow each network node to connect to 64 different network nodes.

Returning to network fabric 100 of FIG. 1, assuming no breakout is implemented on the network device 150, each network node can connect up to four other network nodes using the four respective fabric ports 154. The four network nodes that a particular network node connects to can be selected randomly or pseudo-randomly. The resulting connectivity shown in FIG. 1 can be referred to as a d-regular random graph with a degree d of 4. Hence, in network fabric 100, each network node is connected to four other network nodes. It should be noted that in other implementations, the network fabric can form an irregular random graph in which at least some of the network nodes may have a different degree d.

Figure 2:
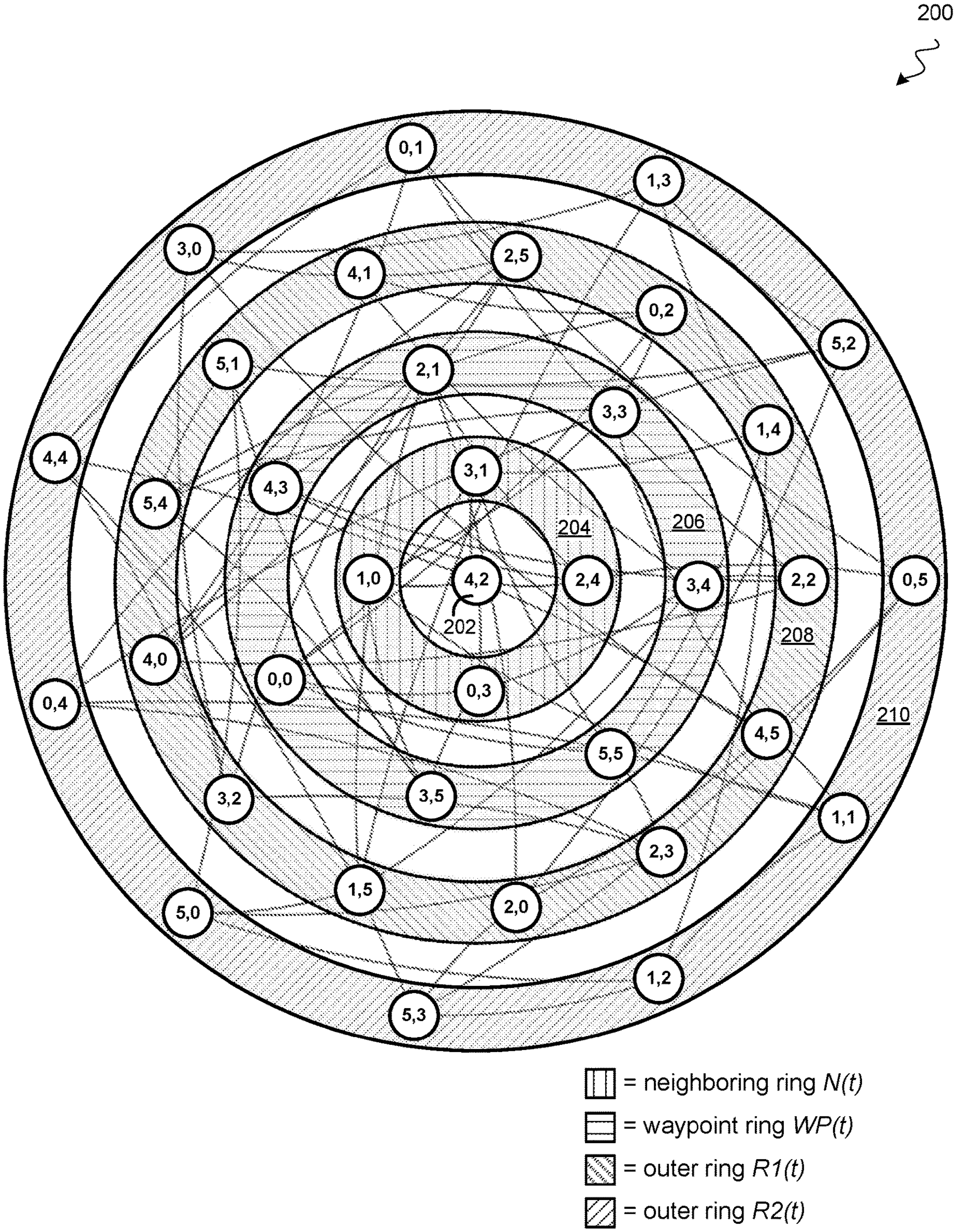
FIG. 2 illustrates an example of a representation of a routing table, according to certain aspects of the disclosure.

FIG. 2 illustrates an example of a representation of a routing table generated for a destination node of a network fabric. All network nodes of the network fabric can be partitioned among the following groups. Each network node is placed in exactly one group for a given destination node t. In other words, each group is mutually exclusive of the other groups.

- N(t): The set of neighbors of destination node t.
- WP(t): The waypoint set composed of p neighbors of each network node r in N(t). The neighbors of each network node r in N(t) can be selected in any suitable manner so long as the selected neighbor is not already in N(t) and is not t.
- R1(t): The set composed of all neighbors of network nodes in WP(t) that are not already in one of the sets above.
- R2(t): The set composed of all neighbors of network nodes in R1(t) that are not already in one of the sets above.
- R3(t): The set composed of all neighbors of network nodes in R2(t) that are not already in one of the sets above.

It should be noted that larger topologies can be supported by implementing more sets (e.g., R4(t) and so on), and smaller topologies can use fewer sets (e.g., omit R3(t)).

Collectively, the groups or sets of network nodes described above can be represented in a routing table as concentric circles around the destination node t, or as logical rings radiating from the destination node t. As such, the set N(t) can be referred to as a neighboring ring, WP(t) can be referred to as a waypoint ring, and each of the sets R1(t), R2(t), R3(t), and so on, can be referred to as an outer ring. It should also be noted that although these groups or sets may be described as concentric circles or logical rings, the concentric circles or logical rings can be represented using any suitable data structures such as tables, lists, etc.

Referring to FIG. 2, to conceptualize the partitioning of network nodes described above, routing table 200 rearranges the 36 network nodes of network fabric 100 of FIG. 1 into concentric circles or logical rings around a destination node t. The destination node 202 at the center of routing table 200 in the example shown is network node r(4,2). The innermost ring corresponds to the neighboring ring N(t) 204, and contains the neighbors of destination node 202. The intermediate ring between the innermost ring and the outer rings corresponds to the waypoint ring WP(t) 206, and contains p neighbors of the network nodes of neighboring ring N(t) 204. In the example shown, p is set to a value of 2. In some instances, two or more network nodes of neighboring ring N(t) 204 may have overlapping set of neighbors, and/or certain network node may have less than p neighbors that are not already in neighboring ring N(t) 204. In such cases, the waypoint ring WP(t) 206 may contain less than p number of neighbors per network node in neighboring ring N(t) 204. The next ring corresponds to the first outer ring R1(t) 208, and contains all neighbors of the network nodes in the waypoint ring WP(t) 206. The outermost ring in routing table 200 corresponds to the second outer ring R2(t) 210, which contains all neighbors of the network nodes in the first outer ring R1(t) 208. Routing table 200 does not have a third outer ring R3(t) because network fabric 100 is small.

Upon partitioning the network fabric into groups with respect to a destination node t, network traffic from a source node s can be routed to the destination node t by applying a set of routing rules to the routing table. The routing rules may include:

- At source node s, packets are sprayed to all neighbors of source node s. For example, the source node s can perform a 5-tuple hash (e.g., source IP address, source port, destination IP address, destination port, and protocol), and sends each packet to a randomly chosen neighbor based on the hash value (e.g., according to ECMP). It should be noted that spraying the network traffic to all neighbors of source node s can occur independent of the destination node t, and can be performed even if destination node t is a neighbor of source node s.
- Each intermediate network node r receiving network traffic that originated from source node s and destined for destination node t forwards the network traffic based on which group or logical ring that the network node r is a member of:

- If r is a member of the neighboring ring (r∈N(t)), forward the network traffic to destination node t.
- If r is a member of the waypoint ring (r∈WP(t)), forward the network traffic to h neighbors randomly selected from neighboring ring N(t). If r has fewer than h neighbors in N(t), forward the network traffic to all neighbors of r in neighboring ring N(t).
- If r is a member of the first outer ring (r∈R1(t)), forward the network traffic to h neighbors randomly selected from waypoint ring WP(t).
- If r is a member of the second outer ring (r∈R2(t)), forward the network traffic to h neighbors randomly selected from waypoint ring R1(t).
- If r is a member of the third outer ring (r∈R3(t)), forward the network traffic to h neighbors randomly selected from waypoint ring R2(t).

The random selection indicated in the above set of routing rules to forward a packet to a randomly selected neighbor can be performed, for example, using ECMP or WCMP.

In the generation of the routing table for a destination node, p is a configurable network parameter that indicates the preset number of neighbors to place in the waypoint ring WP(t) for each network node in the neighboring ring N(t). In the routing algorithm, h is a configurable network parameter that indicates the predetermined number of neighbors of the adjacent ring that the network traffic is forwarded to. The network parameters p and h can be used to control paths between source-neighbors and source-destinations. To maximize capacity, it is preferable for these paths to use as many destinations-neighbors as possible (spraying can ensure that all source-neighbors are used regardless), and to contain as many edge-disjoint paths as possible.

For a fixed set of waypoints, higher values of h can open up more edge-disjoint paths in the network fabric. However, higher values of h may utilize more memory for ECMP path selection, which is dependent on the size of the network fabric. As such, the parameter h can be set based on the size or number of network nodes in the network fabric. In some implementations, the parameter h can set to a first value when the total number of network nodes in the network fabric is less than or equal to a threshold number, and the parameter h can be set to a second value that is less than the first value when the total number of network nodes in the network fabric is greater than the threshold number. By way of example, for fabrics having 4K or fewer network nodes, setting h to 4 provides a good balance between the number edge-disjointed paths and ECMP groups. For fabrics having more than 4K number of network nodes, the parameter h can be set to 2. In other implementations, other values of h can be used. For example, the parameter h can have a value that is greater than 1 and not more than the degree d. In some implementations, the parameter h can have a value that is greater than 1 and less than the $\log_2(d)$.

The parameter p controls how many waypoints are provided to reach the destination node. At one extreme, when p is set to 1, there are exactly d number of waypoints (d being the degree), and each destination-neighbor is connected to just one waypoint. Each source-neighbor can pick one or more waypoints. The exact picks may depend on the parameter h and the topology, but the selection is not directly controlled. As such, it is possible that some waypoints of destination-neighbors may not be used by a source-neighbor. This may lead to a reduction in the total capacity between the source and destination.

At the other extreme, when p is set to d, all neighbors of the network nodes in neighboring ring N(t) are waypoints. This may lead to a reduction in the total capacity if the source node is close to the destination node. After the source node sprays to all of its neighbors, packets will effectively take the shortest paths to the destination node. Many of these paths will be via the source node itself, which means that many of the paths will be routed via the edge between the source node and the destination node to limit the total capacity between the source and destination. This can be avoided if $p<d$ because some neighbors of the source node will be forced to pick non-shortest paths if there is no waypoint available along the shortest path. As such, the parameter p can be set to a value being greater than 1 and less than d. In some implementations, the parameter p can be set to a value of 4.

The above description of the routing table generation and routing algorithm was made with respect to one destination node. To enable a network node to reach every network node in the network fabric, each network node is provided with a set of routing tables in which each map corresponds to one of the network nodes in the fabric other than the network node itself. Hence, in a network fabric of N network nodes, each network node is provided with (N−1) routing tables, one for each possible destination node. Similar to routing table 200, each of the routing tables can be represented as concentric circles around the corresponding destination node or as logical rings of network nodes radiating from the corresponding destination node.

The routing tables for any particular destination node should also be consistent amongst the network nodes such that each network node is using the same set of routing tables. In some implementations, a centralized routing engine can be used to generate the set of routing tables for a given topology, and the set of routing tables can be pushed to each network node in the fabric. In some implementations, each network node may include a routing engine with logic to generate the set of routing tables. The routing engine can adhere to link-state protocol such that all network nodes in the network fabric are made aware of the network topology. To ensure the network nodes generate the same routing tables for a given destination node, each network node should compute the same waypoint ring WP(t) for any given destination node t. This can be achieved by using a deterministic function for the waypoint computation/selection. For example, the neighbors of each network node in the neighboring ring N(t) can be ordered (e.g., sorted by network node identifier), and the routing engine may select the first p neighbors that are not in N(t). Alternatively, consistent hashing techniques could be implemented. For example, hash values of node identifiers can be computed for each node in the neighboring ring N(t), sorted and placed on a hash ring. The routing engine may then compute the p entries from the hash ring that are closest to the hash of a prime number pre-shared among all nodes.

Figure 3:
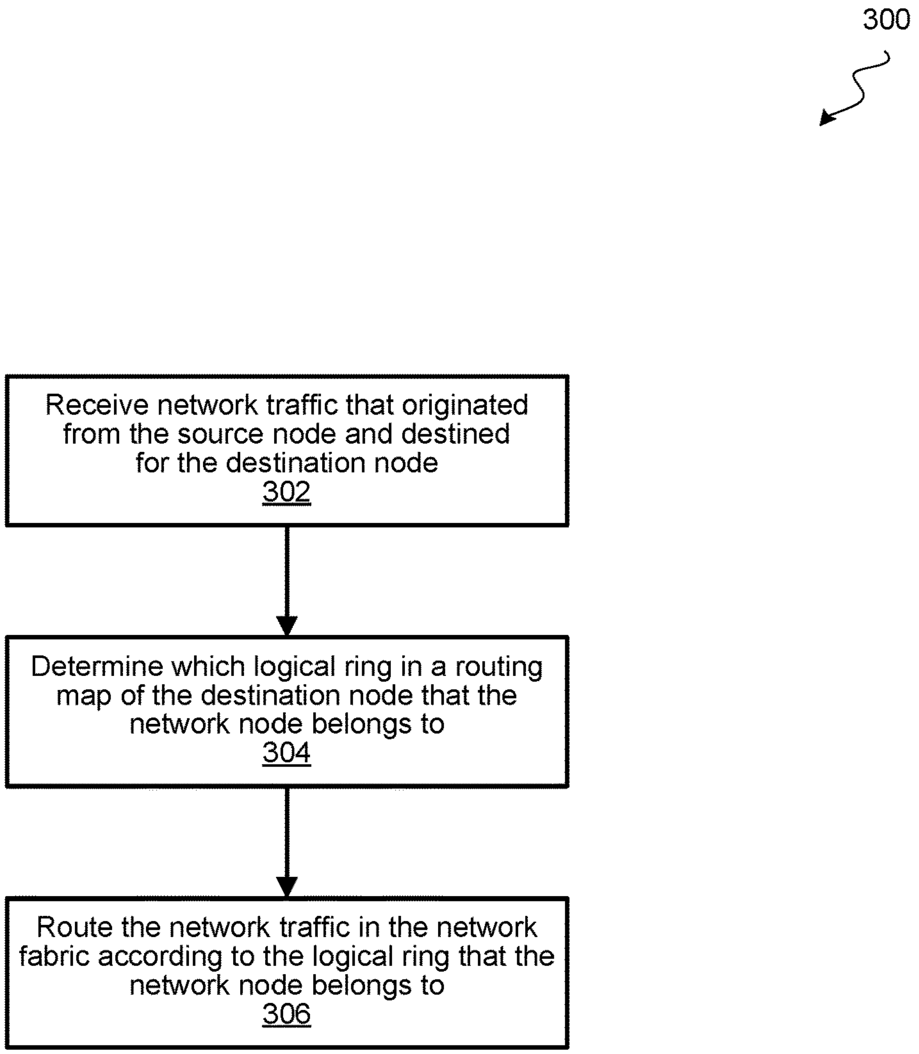
FIG. 3 illustrates a flow diagram of an example of a process for routing traffic in a network fabric, according to certain aspects of the disclosure.

FIG. 3 illustrates a flow diagram of an example of a process 300 for routing network traffic between a source node and a destination node in a network fabric. The network fabric may include network nodes (e.g., switch, router, etc.) that each connect to a degree d number of other network nodes in the network fabric. In some implementations, the set of d network nodes that a particular network node connects to can be randomly or pseudo-randomly selected. Process 300 can be performed, for example, by routing logic (e.g., implemented in a routing engine) of each network node. Hence, the routing scheme can operate in a fully distributed fashion without using a centralized controller. Alternatively or optionally, the network node may operate under the direction of a control plane (e.g., a centralized control plane for managing network traffic in the fabric).

Certain aspects of process 1100 can be implemented as instructions or commands (e.g., software code, etc.) stored in a non-transitory computer-readable medium, which can be executed by a network device to perform the various operations.

Process 300 may begin at block 302 by receiving, by a network node, network traffic that originated from the source node and destined for the destination node. For example, the source node may have sprayed the network traffic destined for the destination node to all neighbors of the source node, and the network node receiving the network traffic can be one of the source node's neighbor. The network node receiving the network traffic can also be an intermediate node further along a path between the source node and the destination node.

At block 304, a determination is made as to which logical ring in a routing table associated with the destination node that the network node belongs to. As described herein, the routing table associated with a particular destination node can be represented as a set of logical rings radiating from the destination node being at the center of the logical rings. The routing table can be obtained, for example, by using a routing engine of the network node to generate the routing table locally, or by a centralized routing engine or control plane pushing the routing table to the network node (e.g., during provisioning).

The logical rings may include an innermost ring, an intermediate ring, and a set of one or more outer rings. Starting from the center, the innermost ring can be a neighboring ring N(t) containing d number of neighbors of the destination node t. The intermediate ring can be a waypoint ring WP(t) containing a preset p number of neighbors of each network node in the neighboring ring N(t). The set of one or more outer rings may each contain all neighbors of network nodes of an adjacent inner ring. For example, the first outer ring R1(t) may contain all neighbors of network nodes of the adjacent waypoint ring WP(t) which are not in ring N(t). The second outer ring R2(t) may contain all neighbors of network nodes of the adjacent first outer ring R1(t) which are not in ring WP(t). The third outer ring R3(t) may contain all neighbors of network nodes of the adjacent second outer ring R2(t) which are not in ring R1(t), and so on. The number of outer rings may vary depending on the degree and number of network nodes in the network fabric.

At block 306, the network traffic received by the network node is routed in the network fabric towards the destination node according to the logical ring that the network node belongs to. The routing can be performed by applying a set of routing rules to the routing table associated with the destination node. The set of routing rules may include forwarding the network traffic to the destination node when the network node belongs to the neighboring ring N(t) of the destination node. The set of routing rules may also include forwarding the network traffic to a predetermined h number of randomly selected neighbors of the network node in an adjacent ring of the logical ring towards the destination node when the network node is outside the neighboring ring. In some scenarios, when the logical ring that the network node belongs to is the waypoint ring WP(t), the neighboring ring N(t) may have fewer neighbors of the network node than the predetermined number h. In such scenarios, the network traffic can be forwarded to all neighbors of the network node in the neighboring ring N(t).

Figure 4:
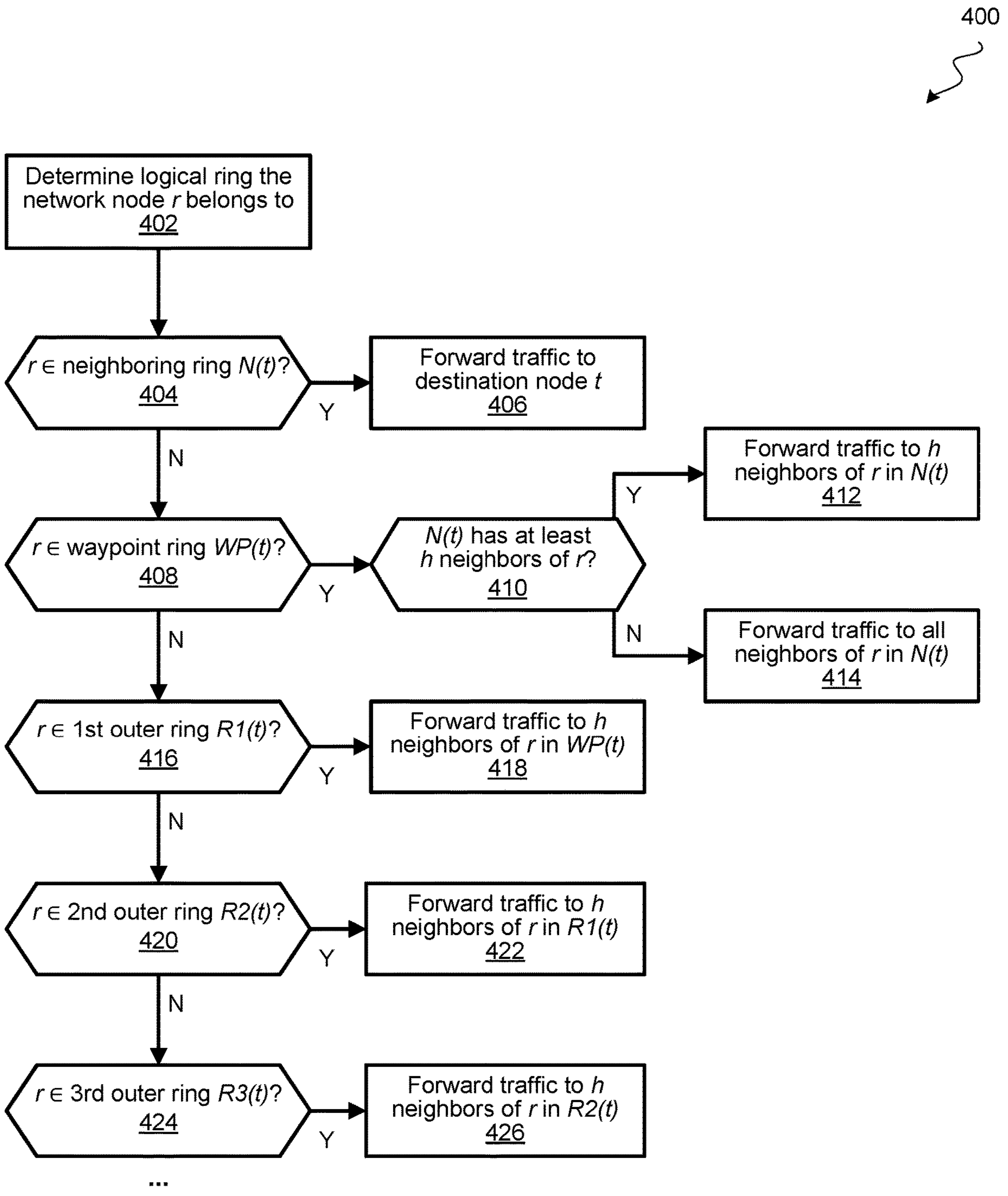
FIG. 4 illustrates a flow diagram of an example of a process that can be used in a routing algorithm, according to certain aspects of the disclosure.

FIG. 4 illustrates a flow diagram of an example of a process 400 that can be used as part of a routing algorithm employed in block 306 of process 300. Process 400 may begin at block 402 by determining the logical ring that the network node r belongs to in the routing table associated with the destination node t. If the network node r is determined at block 404 to be a member of the neighboring ring N(t), then the network traffic can be forwarded directly to the destination node t at block 406.

If the network node r is determined at block 408 to be a member of the waypoint ring WP(t), then a determination can be made if the neighboring ring N(t) has at least h number of neighbors of network node r. If the neighboring ring N(t) has the sufficient number of neighbors, then the network traffic can be forwarded to h randomly selected neighbors of network node r in the neighboring ring N(t) at block 412. If the neighboring ring N(t) does not have the sufficient number of neighbors, then the network traffic can be forwarded to all neighbors of network node r in the neighboring ring N(t) at block 414.

If the network node r is determined at block 416 to be a member of the first outer ring R1(t), the network traffic can be forwarded to h randomly selected neighbors of network node r in the waypoint ring WP(t) at block 418. If the network node r is determined at block 420 to be a member of the second outer ring R2(t), the network traffic can be forwarded to h randomly selected neighbors of network node r in the first outer ring R1(t) at block 422. If the network node r is determined at block 424 to be a member of the third outer ring R3(t), the network traffic can be forwarded to h randomly selected neighbors of network node r in the second outer ring R2(t) at block 426. If the routing table has additional outer rings, a similar routing rule can be applied to the additional outer rings to forward the network traffic to h randomly selected neighbors of network node r in the adjacent inner ring.

Figure 5:
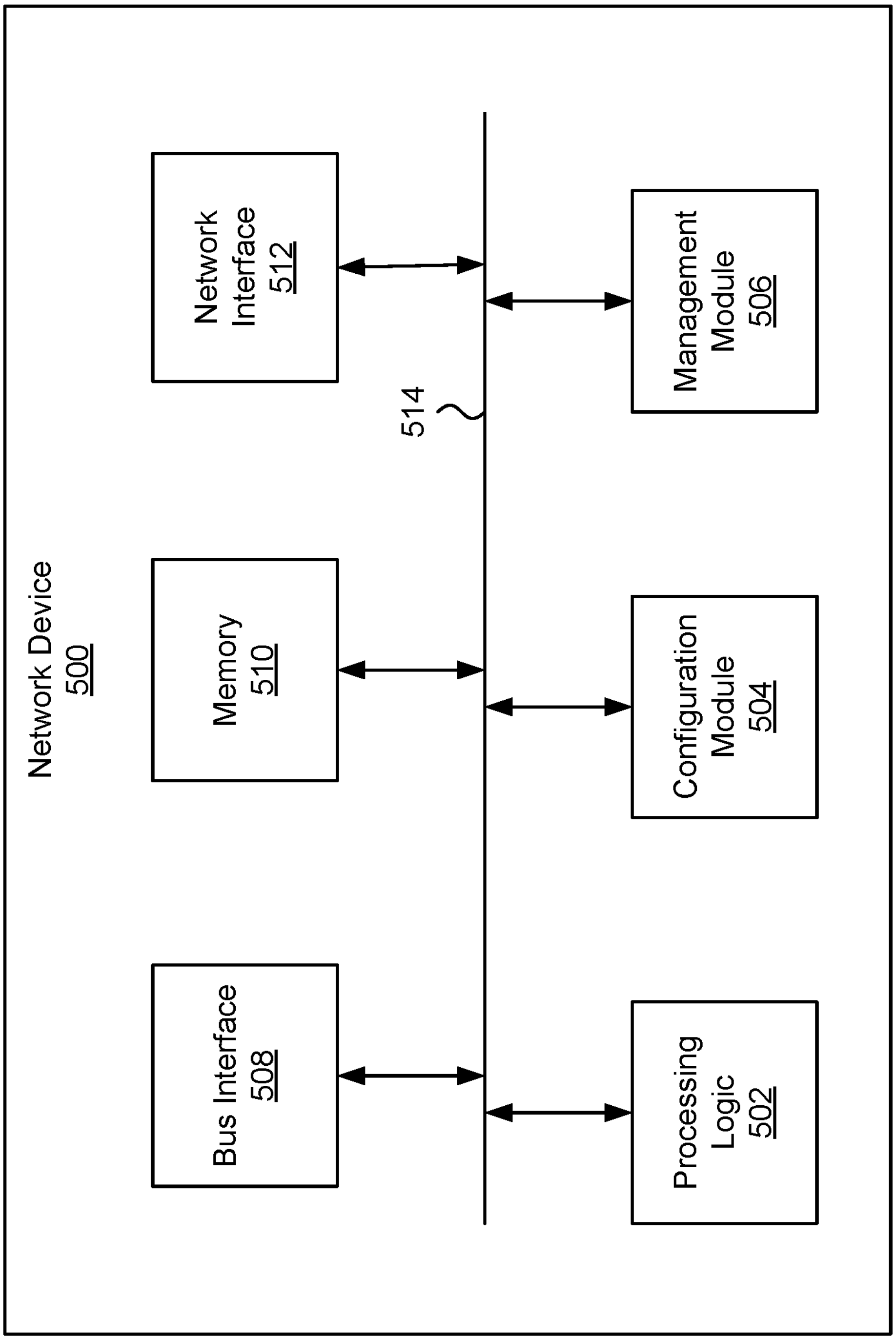
FIG. 5 illustrates an example of a network device, according to certain aspects of the disclosure.

FIG. 5 illustrates an example of a network device 500. Functionality and/or several components of the network device 500 may be used without limitation with other embodiments disclosed elsewhere in this disclosure, without limitations. Network device 500 can be used, for example, as a network node in a network fabric. A network device 500 may facilitate processing of packets and/or forwarding of packets from the network device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 500 may be the recipient and/or generator of packets. In some implementations, the network device 500 may modify the contents of the packet before forwarding the packet to another device. The network device 500 may be a peripheral device coupled to another computer device, a switch, a router or any other suitable device enabled for receiving and forwarding packets.

In one example, the network device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The network device 500 may include additional modules, not illustrated here such as other components of a network node described herein (e.g., fabric ports, server ports, etc.).

In some implementations, the network device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel©, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the network device 500, while in other cases some or all of the memory may be external to the network device 500. The memory 510 may store an operating system comprising executable instructions that, when executed by the processing logic 502, provides the execution environment for executing instructions providing networking functionality for the network device 500. The memory may also store and maintain several data structures and routing tables for facilitating the functionality of the network device 500.

In some implementations, the configuration module 504 may include one or more configuration registers. Configuration registers may control the operations of the network device 500. In some implementations, one or more bits in the configuration register can represent certain capabilities of the network device 500. Configuration registers may be programmed by instructions executing in the processing logic 502, and/or by an external entity, such as a host device, an operating system executing on a host device, and/or a remote device. The configuration module 504 may further include hardware and/or software that control the operations of the network device 500.

In some implementations, the management module 506 may be configured to manage different components of the network device 500. In some cases, the management module 506 may configure one or more bits in one or more configuration registers at power up, to enable or disable certain capabilities of the network device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the network device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.13 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 500 may include multiple network interface modules, each configured to communicate with a different network. For example, in these implementations, the network device 500 may include a network interface module for communicating with a wired Ethernet network, a wireless 802.11 network, a cellular network, an Infiniband network, etc.

The various components and modules of the network device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, and/or functions described herein can be provided by one or more modules that exist as separate modules and/or module functions described herein can be spread over multiple modules. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network fabric, comprising:

a plurality of network nodes, wherein each network node is connected to a degree d number of other network nodes in the network fabric, and wherein each network node is configured to route packets in the network fabric based on a set of routing tables corresponding to other network nodes in the network fabric, each of the routing tables represented as a plurality of logical rings of network nodes radiating from a corresponding destination node, the plurality of logical rings including:

an innermost ring being a neighboring ring containing d number of neighbors of the corresponding destination node;

an intermediate ring between the innermost ring and a set of one or more outer rings, the intermediate ring being a waypoint ring containing a preset p number of neighbors of each network node in the neighboring ring, wherein p is greater than 1 and less than a degree of each network node; and the set of one or more outer rings each containing all neighbors of network nodes of an adjacent inner ring.

2. The network fabric of claim 1, wherein a network node acting as a source node is configured to spray network traffic to all neighbors of the source node.

3. The network fabric of claim 1, wherein a network node receiving network traffic for a destination node is configured to forward the network traffic by applying a set of routing rules to a routing table corresponding to the destination node, the set of routing rules including:

when the network node belongs to the neighboring ring, forwarding the network traffic to the destination node;

when the network node belongs to the waypoint ring, forwarding the network traffic to a predetermined h number of neighbors randomly selected from the neighboring ring if a total number of neighbors of the network node in the neighboring ring is at least h, or to all neighbors of the network node in the neighboring ring if the total number of neighbors of the network node in the neighboring ring is less than h; and when the network node belongs to an outer ring, forwarding the network traffic to the predetermined h number of neighbors randomly selected from an adjacent inner ring.

4. The network fabric of claim 3, wherein the predetermined h number of neighbors is set based on a total number of network nodes in the network fabric.

5. A computer-implemented method for routing network traffic between a source node and a destination node in a network fabric, the method comprising:

receiving, at a network node, network traffic that originated from the source node and is destined for the destination node;

determining which logical ring in a routing table associated with the destination node that the network node belongs to, wherein the routing table is represented by a plurality of logical rings radiating from the destination node comprising:

a neighboring ring containing neighbors of the destination node;

a waypoint ring containing a preset number of neighbors of each network node in the neighboring ring, wherein the preset number of neighbors of each network node is greater than 1 and less than a degree of each network node; and one or more outer rings each containing neighbors of network nodes of an adjacent inner ring; and routing the network traffic in the network fabric according to the logical ring that the network node belongs to.

6. The computer-implemented method of claim 5, wherein routing the network traffic includes forwarding the network traffic directly to the destination node when the network node belongs to the neighboring ring.

7. The computer-implemented method of claim 5, wherein routing the network traffic includes forwarding the network traffic based on a network parameter indicating a predetermined number of neighbors of the network node to select.

8. The computer-implemented method of claim 7, wherein when the network node belongs to the waypoint ring and the neighboring ring contains at least the predetermined number of neighbors of the network node, routing the network traffic includes forwarding the network traffic to the predetermined number of neighbors of the network node selected randomly from the neighboring ring.

9. The computer-implemented method of claim 7, wherein when the network node belongs to the waypoint ring and the neighboring ring contains fewer than the predetermined number of neighbors of the network node, routing the network traffic includes sending the network traffic to all neighbors of the network node in the neighboring ring.

10. The computer-implemented method of claim 7, wherein when the network node belongs to an outer ring, routing the network traffic includes sending the network traffic to the predetermined number of neighbors of the network node selected randomly from an adjacent inner ring of the outer ring.

11. The computer-implemented method of claim 7, wherein the predetermined number of neighbors of the network node is set based on a total number of network nodes in the network fabric.

12. The computer-implemented method of claim 11, wherein the predetermined number of neighbors of the network node is set to a first value when the total number of network nodes in the network fabric is less than or equal to a threshold number, and wherein the predetermined number of neighbors of the network node is set to a second value that is less than the first value when the total number of network nodes in the network fabric is greater than the threshold number.

13. The computer-implemented method of claim 7, wherein the predetermined number of neighbors of the network node to select is greater than 1 and not more than a degree of each network node.

14. The computer-implemented method of claim 7, wherein the predetermined number of neighbors of the network node to select is 2 or 4.

15. The computer-implemented method of claim 14, wherein the preset number of neighbors of each network node is 4.

16. A non-transitory computer-readable medium storing code that, when executed by one or more processors, causes the one or more processors to perform operations for routing network traffic received by a network node destined for a destination node in a network fabric, the operations including:

obtaining a routing table for the destination node that is represented by a plurality of logical rings radiating from the destination node, the plurality of logical rings including:

an innermost ring being a neighboring ring containing neighbors of the corresponding destination node;

an intermediate ring between the innermost ring and a set of one or more outer rings, the intermediate ring being a waypoint ring containing a preset number of neighbors of each network node in the neighboring ring, wherein the preset number of neighbors is greater than 1 and less than a degree of each network node; and the set of one or more outer rings, wherein each outer ring contains all neighbors of network nodes of an adjacent inner ring;

determining which logical ring in the routing table that the network node belongs to; and routing the network traffic based on the logical ring that the network node belongs to.

17. The non-transitory computer-readable medium of claim 16, wherein the network traffic is routed based on a set of routing rules including:

forwarding the network traffic to the destination node when the network node belongs to the neighboring ring; and forwarding the network traffic to a predetermined number of randomly selected neighbors of the network node in an adjacent ring of the logical ring towards the destination node when the network node is outside the neighboring ring.

18. The non-transitory computer-readable medium of claim 17, wherein the set of routing rules further include forwarding the network traffic to all neighbors of the network node in the neighboring ring when the logical ring that the network node belongs to is the waypoint ring, and the neighboring ring has fewer neighbors of the network node than the predetermined number.

19. The non-transitory computer-readable medium of claim 17, wherein the predetermined number is set based on a size of the network fabric.

20. The computer-implemented method of claim 5, wherein the source node sprays the network traffic to all neighbors of the source node.

* * * * *